(12) United States Patent
Langston et al.

(10) Patent No.: US 12,103,095 B2
(45) Date of Patent: Oct. 1, 2024

(54) METHODS AND APPARATUS FOR IN-POCKET TENDON SHEARING

(71) Applicant: POST TECH MANUFACTURING, LLC, Fort Worth, TX (US)

(72) Inventors: Evan Langston, Fort Worth, TX (US); Bryant Morgan, Maryland Heights, MO (US)

(73) Assignee: POST TECH MANUFACTURING, LLC, Fort Worth, TX (US)

(*) Notice: Subject to any disclaimer, the term of this patent is extended or adjusted under 35 U.S.C. 154(b) by 0 days.

(21) Appl. No.: 17/805,788

(22) Filed: Jun. 7, 2022

(65) Prior Publication Data

US 2022/0388080 A1    Dec. 8, 2022

Related U.S. Application Data

(60) Provisional application No. 63/202,323, filed on Jun. 7, 2021.

(51) Int. Cl.
| | | |
|---|---|---|
| *B23D 29/00* | (2006.01) | |
| *E04G 21/16* | (2006.01) | |
| *E04C 5/08* | (2006.01) | |

(52) U.S. Cl.
CPC .......... *B23D 29/002* (2013.01); *E04G 21/16* (2013.01); *E04C 5/08* (2013.01)

(58) Field of Classification Search
CPC .... B23D 29/002; B23D 17/04; B23D 29/023; B23D 33/02; E04G 21/16; E04C 5/04; F16H 25/2253; H02G 1/005; B26B 15/00; B21F 11/00

USPC .................................. 83/13; 30/228; 7/107
See application file for complete search history.

(56) References Cited

U.S. PATENT DOCUMENTS

| | | | | |
|---|---|---|---|---|
| 3,175,289 | A * | 3/1965 | Wilterdink | H02G 1/005 30/DIG. 4 |
| 4,802,278 | A * | 2/1989 | Vanderpol | B26D 3/169 74/435 |
| 7,013,567 | B2 * | 3/2006 | Myers | B23D 21/04 82/83 |
| 7,845,080 | B2 * | 12/2010 | Nasiell | B23D 21/04 30/95 |
| 10,625,435 | B2 * | 4/2020 | Wang | B26D 1/16 |
| 2005/0081388 | A1 * | 4/2005 | Konen | B23D 29/002 30/92 |
| 2010/0077621 | A1 * | 4/2010 | Quigley | B26B 15/00 30/228 |

(Continued)

FOREIGN PATENT DOCUMENTS

JP          10249073 A  *  9/1998  ............. B26B 15/00

*Primary Examiner* — Ghassem Alie
(74) *Attorney, Agent, or Firm* — Whitaker Chalk Swindle & Schwartz LLP; Decker A. Cammack

(57) ABSTRACT

An apparatus, system, and method for shearing cables, such as those used in concrete support structures, is presented. In one embodiment, an apparatus is presented that can include a casing, a handle, a cutting nose, a torque conversion mechanism, and a cable support. The cable support can be configured to removably couple to a cable, such as to secure the cable within a cable groove of the apparatus. In another embodiment, a system for cable shearing is presented, wherein the system comprises a shearing apparatus and torque-generation apparatus. In another embodiment, a method of clipping cables, such as within a pocket, is presented.

9 Claims, 8 Drawing Sheets

(56) References Cited

U.S. PATENT DOCUMENTS

| | | | |
|---|---|---|---|
| 2014/0007433 A1* | 1/2014 | Kochi | B26B 15/00 30/228 |
| 2019/0275691 A1* | 9/2019 | Wang | B23D 21/04 |
| 2021/0237142 A1* | 8/2021 | Sorkin | B23D 29/023 |

* cited by examiner

METHODS AND APPARATUS FOR IN-POCKET TENDON SHEARING

BACKGROUND

1. Field of the Disclosure

This disclosure relates to a method and apparatus for shearing tendons used in structural concrete support post-tensioning systems. The disclosure discussed herein has applicability to systems that employ a simple two-anchor system having a dead end and a live end, as well as systems that employ intermediate anchors, such as would be need for high-strength and/or large slab applications.

2. Claim of Priority

This application claims priority to U.S. Provisional Patent Application 62/202,323, filed on Jun. 7, 2021.

3. Background of the Disclosure

Construction with concrete has been prevalent in both commercial and residential applications for more than a century. As construction methods have evolved, so has the composition and use of structural concrete.

Concrete has enormous compressive strength, but historically has needed beam construction to support tensile and lateral strength. While simple and economical, a post-and-beam structure, designed to support floors and/or roofs made of concrete slabs, are unsightly, and unnecessarily reduce usable square footage within the square footage of the concrete slab by taking up valuable space. Accordingly, various methods have been created to increase the tensile strength of concrete. One method of increasing the tensile strength of concrete has been to add rebar, or steel rods, within the concrete. However, this method is only marginally successful at increasing the tensile strength.

Two of the simpler and more effective slab-strengthening methods are pre-tensioning and post-tensioning. Pre-tensioning occurs in a controlled shop environment where strands of wire, or tendon, are stretched from end-to-end of a form, and then concrete is poured around the pre-stretched tendons. When the concrete cures, it adheres to the tendons, which provide compressive force along the axis of the tendon, thus increasing the tensile strength of the concrete slab.

Post-tensioning is a more cost effective and efficient method of reinforcing concrete slabs. In post-tensioning, a tendon is anchored at one end of a slab form—a fixed end—and is laid along an axis of the form in an unstressed state. The tendon is housed in a sheath, which allows the tendon to move freely within the sheath. In most cases, the tendon is surrounded by heavy grease to assist its longitudinal movement within the sheath. Concrete is then poured within the form surrounding the tendon. Once the concrete has been poured into the form (on the construction site), the tendon is tensioned with a jack at an anchor at the opposite end of the tendon from the fixed end. This second anchor is known as the "live end." There may be one or more intermediate anchors within the slab, depending on the span covered by the tendon. Typically, strands of tendons are placed perpendicular to one another to tension the concrete slab along both a vertical and horizontal axis along the plane of the slab. The benefits to post-tensioning are numerous. First, post-tensioning allows the slab to be formed and poured on site, ensuring that the form is exactly correct in its dimensions. Second, because the slab is poured on site, transportation costs are reduced because finished pre-tensioned slabs require extremely large vehicles to move them from shop to site. Additionally, but not exhaustively, pre-tensioning is dangerous in a shop environment, because thousands of pounds of force are applied to a pre-tensioned tendon with nothing to prevent it from harming workings in the event it snaps before the concrete is poured. In post-tensioning, the tendon is unstressed with the concrete is poured, so in the event of a tendon failure during tensioning, it is surrounded by a large amount of concrete, which prevents the tendon from whipping out of the form.

When the post-tensioning system is tensioned, a tail of tendon extends through the live-end anchor. Typically, a jack is affixed to the end of the tendon at a device called a pocket former. The pocket former ensures that once the concrete is poured, there is sufficient space to install the jack by preventing the ingress of concrete into the area where the tendon protrudes through the live-end anchor. Wedges are installed around the tail of the tendon, which will have no sheathing. The wedges typically have beveled "teeth" facing the tail end, such that when the tendon is released, the wedges in the anchor cavity seat, grab the tendon by biting into the metal cable strands, and prevent the tendon from retracting after tensioning. Once the desired tension is achieved, the tendon is cut as close to the anchor cavity as possible.

There are several ways to accomplish clipping of the tendon, such as via saws, torches, or specialized apparatuses. Saws can be dangerous, prone to kicking back at the operator, and additionally cannot sever the tendon within the pocket, leaving the end of the tendon protruding from the concrete and vulnerable to corrosion. Torches are also not ideal, as they can overheat the plastic and polymer materials associated with the tendon and accompanying anchors, leading to construction and corrosion problems. Because of these issues, a hydraulic or battery-powered cutting apparatus is often utilized to accomplish shearing of the tendon. However, hydraulic apparatuses require pumps to function, which can be unwieldy, heavy, and difficult to operate, especially for construction workers or engineers that need to clip tendons that are located dozens of stories above the ground. Battery-powered apparatuses, while not requiring a pump, do require dedicated batteries and motors to function, adding to the cost of the device. Further, generating enough pressure to clip tensioned tendons via such a battery-powered apparatus is extremely difficult, leading to poor battery life and frequent equipment failure.

SUMMARY OF THE INVENTION

In one embodiment, the present disclosure can include a shearing apparatus comprising: a casing; a torque conversion mechanism disposed within the casing, the torque conversion mechanism including epicyclic gearing; a cutting nose coupled to the casing, wherein the cutting nose is in operable connection with the torque conversion mechanism; a cable support; and a handle coupled to the casing, wherein the cable support is configured to removably coupled to a cable.

In another embodiment, the present disclosure can include a shearing system, the system comprising: a shearing apparatus comprising: a casing; a torque conversion mechanism including an adapter and disposed within the casing; a cutting nose comprising a blade, wherein the cutting nose is coupled to the casing and is in operable connection with the torque conversion mechanism; a cable support; and a handle coupled to the casing; and a torque generator engaged with the shaft; wherein rotation of the adapter by the torque generator engages the torque conversion mechanism; wherein the torque conversion mechanism is operable to use the rotation at the adapter to mobilize the blade of the cutting nose.

In another embodiment, the present disclosure can include a method of shearing a cable in a concrete support system, the method comprising the steps of: providing a shearing apparatus, the shearing apparatus comprising: a casing; a torque conversion mechanism including an adapter and disposed within the casing; a cutting nose comprising a blade, wherein the cutting nose is coupled to the casing and is in operable connection with the torque conversion mechanism; a cable support; a handle coupled to the casing; and a groove; removably coupling the shearing apparatus to a cable via the cable support; and applying torque to the adapter of the shearing apparatus.

DETAILED DESCRIPTION OF THE INVENTION

Figure 1A:
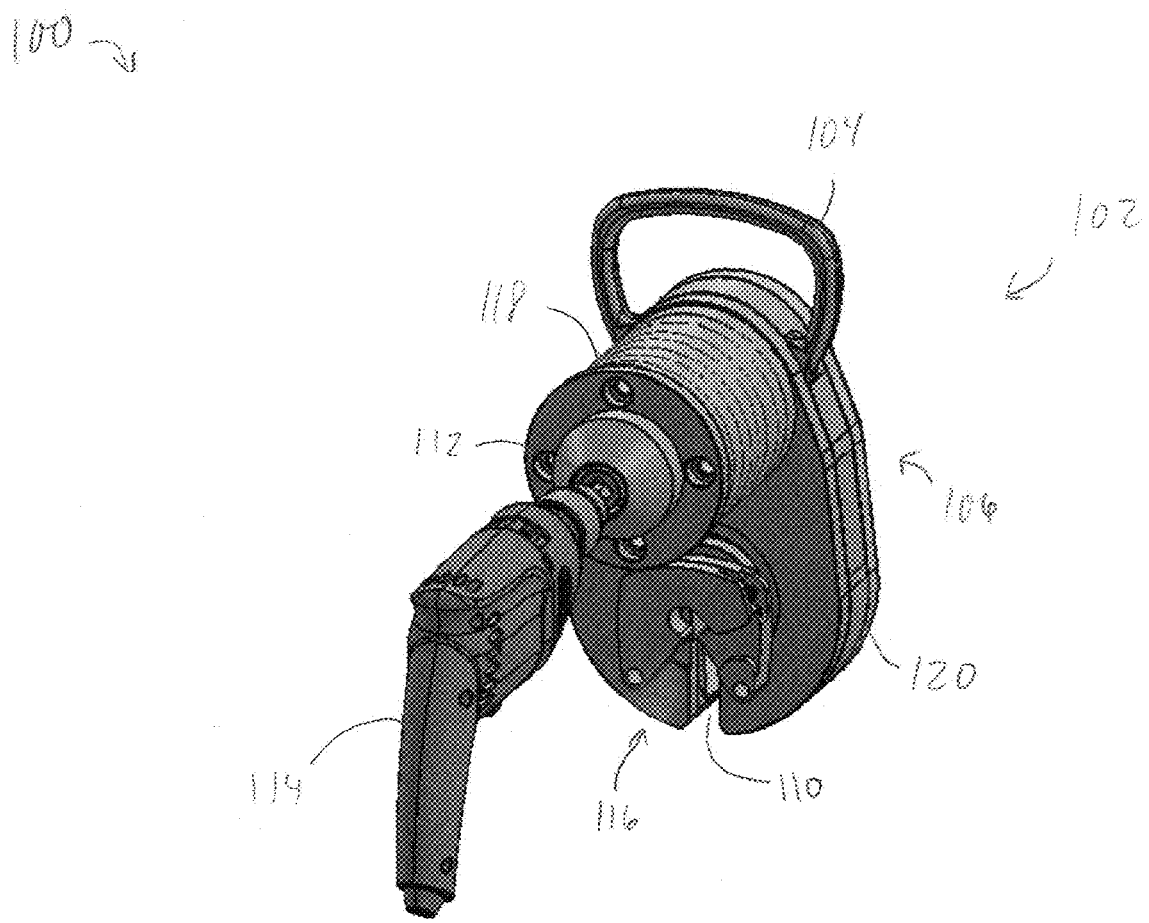
FIGS. 1A-1D illustrate perspective views of a shearing system in accordance with the principles of the present disclosure.
Figure 1B:
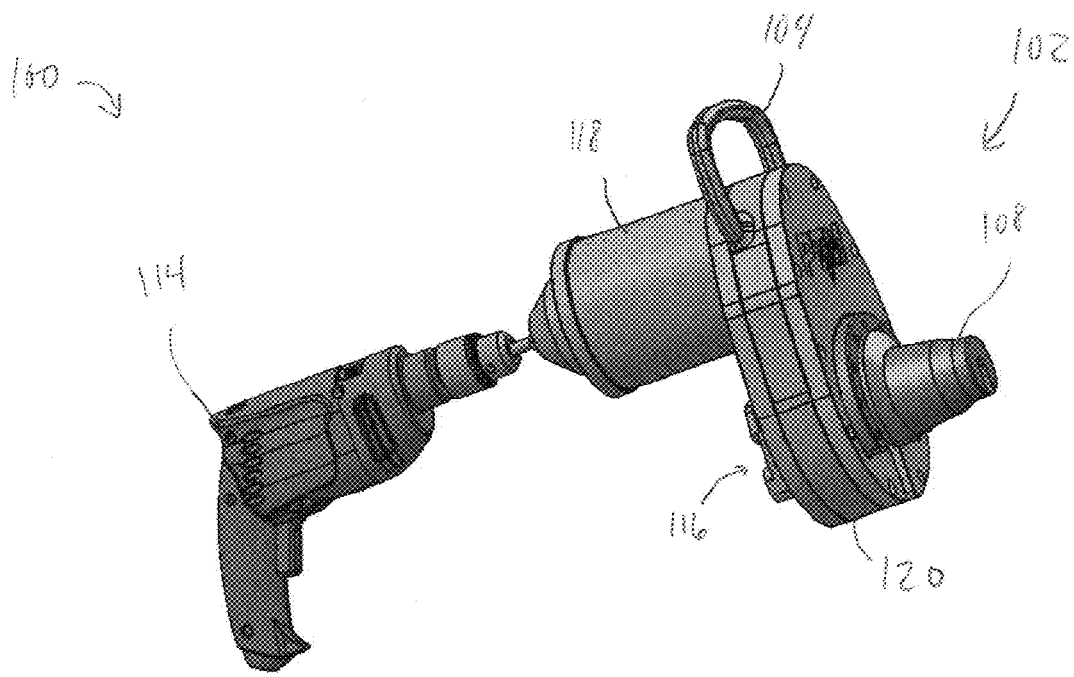
Figure 1C:
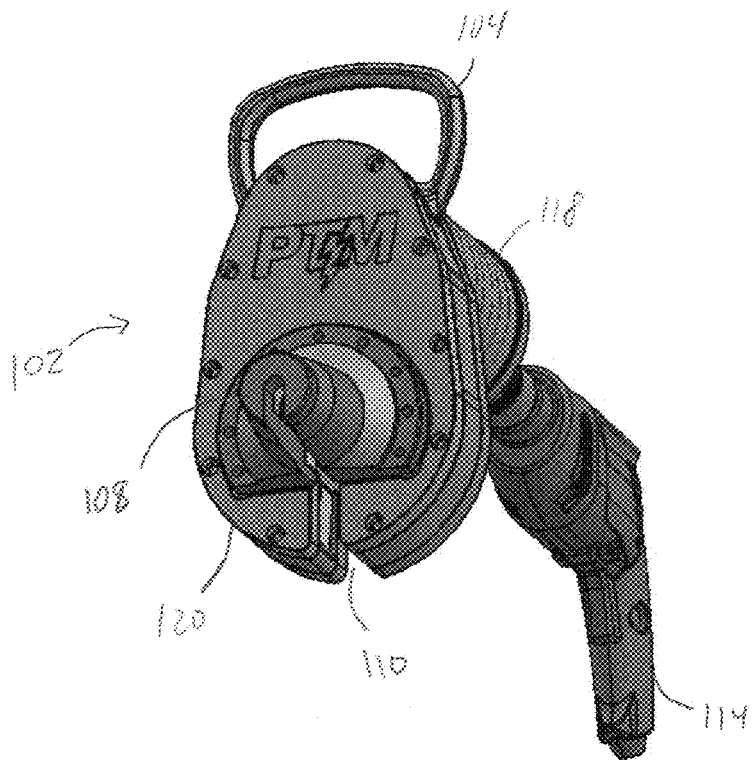
Figure 1D:
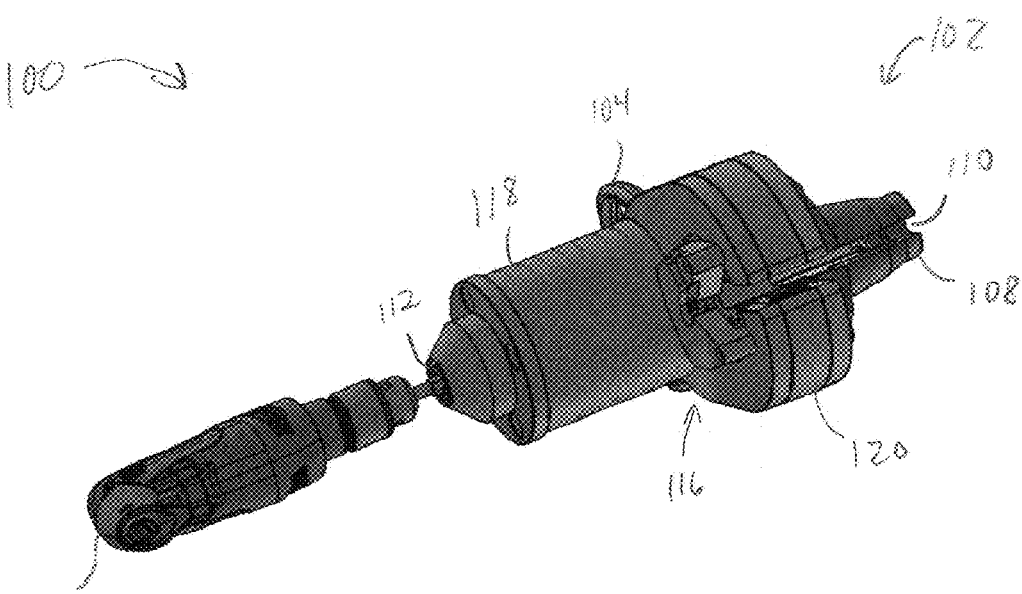

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

FIGS. 1A-1D depicts one embodiment of the present disclosure. A shearing system 100 can include a shearing apparatus 102 and a torque generator 114. In one embodiment, the torque generator 114 can include any motorized or powered tool, such as power drills, electric screwdriving apparatuses, electric drills, impact drills, power saws, dremels, or any other power tool known in the art operable to generate and apply torque. In another embodiment, the torque generator can include a ratchet, wrench, crank, or any other device or apparatus suitable to generate torque or allow a user of the device to generate torque. Preferably, the torque generator is a drill apparatus 114. In an exemplary embodiment, the drill apparatus 114 can comprise an electric drill known in the art. The shearing apparatus 102 can include a handle 104, a casing 106, a cutting nose 108, a groove (cable groove) 110, and an adapter 112. The handle 104 can take any form suitable to enable a user of the apparatus 102 to grip the apparatus 102. In another embodiment, the handle 104 can take any form suitable to lend structure to the apparatus 102 and support the casing 106.

In one embodiment, the casing 106 can provide a main body to the apparatus 102 and can be operable to contain mechanisms (not shown in FIGS. 1A-1D) of the apparatus 102, such as the torque conversion apparatus or myriad of gears discussed with respect to FIGS. 3A-3D. The casing 106 can be fastened to the handle 104 and can further be configured to receive a cable via the cable groove 110. The casing 106 can additionally be coupled to the cutting nose 108, such that the nose 108 can protrude from the casing 106. In one example, the casing 106 can be a gearbox 106; in another example, the casing 106 can be a sphere, pyramid, or another other shape suitable to connect to the handle 104 and cutting nose 108 while casing mechanisms of the apparatus, such as those discussed in FIGS. 3A-3D. The casing 106 can also be configured to allow interaction with the mechanisms contained within the casing 106. For example, and as mentioned above, the casing 106 and cutting nose 108 can comprise recessed areas that together form a cable groove 110. The cable groove 110 can be of any size or shape suitable to receive a cable of any size. In this manner, and as an example, the casing 106 can be configured to allow mechanisms contained therein to interact with the cable, such as via the cable groove 110. As another example, the casing 106 can comprise one or more orifices from which an adapter 112 can protrude. In another embodiment, the adapter 112 can be contained within the casing 106, and a drill apparatus 114 can access the adapter 112 through a hole in the casing 106.

In another embodiment, the casing 106 can include a first member 118 and a second member 120. For example, the first member 118 can be operably coupled to the second member 120. In another example, the first member 118 can extend from the second member 120. In another example, the first member 118 can be configured to house a portion of a torque conversion mechanism in accordance with the principles of the present disclosure. For example, the first portion 118 can be configured to house epicyclic gearing or any other suitable gearing mechanism. In another example, the first member 118 can be substantially cylindrical, such as to minimize a profile of the first member 118 and accomplish housing of components of a torque conversion mechanism. In another embodiment, the second member 120 can be configured to house a different portion of a torque conversion mechanism. For example, the second member 120 can be configured to house a portion of a torque conversion mechanism, such as a sun gear, drive gear, and/or spur gear.

In one embodiment, the adapter 112 can be configured to engage mechanisms disposed within the casing 106 via turning of the adapter 112. As an example, the adapter 112 can be configured to engage a power drill/screwdriver, with any suitable wrench head attached thereto, and transfer torque generated from the drill/screwdriver to mechanisms disposed within the casing 106. In one embodiment, the adapter 112 can comprise a hexagonal wrench head, a flat head, or any other wrench head suitable to transfer torque from the torque generator. In this manner, and as an example, the casing 106 can be configured to allow interaction with the mechanisms within the casing 106. In another embodiment, the casing 106 can further include a cable support 116. For example, the cable support 116 can take the form of a latch operable to support a cable within the cable groove 110. In one embodiment, the support 116 can be "opened" via, for example, a hinge mechanism, and after a cable is engaged within the cable groove, the support 116 can be "closed" to offer support to the cable while it is within the groove 110. The support 116 can include any suitable mechanism to support the cable within the groove 110.

In one embodiment, the adapter 112 can interact with mechanisms disposed within the casing 106 to ultimately operate the cutting nose 108. For example, the nose 108 can protrude from the casing 106 such that the nose 108 can engage a cable within a pocket of a concrete support post-tensioning system. The nose 108 can include one or more blades (not shown in FIGS. 1A-1D) operable to sever a cable that is engaged within the cable groove 110 and cutting nose 108. As mentioned above, in one example, the nose 108 can be configured to fit within a pocket of a concrete support post-tensioning system such that the blades of the nose 108 can clip the cable within the pocket. In another embodiment, applying torque to the adapter 112 can initiate mechanisms disposed within the casing 106 that are in operable connection with the cutting nose 108 to engage a blade or blades of the nose 108 to facilitate shearing of the cable. In another embodiment, the cutting nose 108 can comprise a static blade and a rotating blade. In another embodiment, the cutting nose 108 can comprise any number of static blades and/or mobile blades to accomplish the shearing of a cable. In another embodiment, the cutting nose 108 can take the form of any cutting nose known in the art.

FIGS. 2A-2H depict one embodiment of the present disclosure. A shearing apparatus 200 can include a handle 204, a casing 202, a cutting nose 220, a groove (cable groove) 210, and an adapter 212. The handle 204 can take any form suitable to enable a user of the apparatus 200 to grip the apparatus 200. In another embodiment, the handle 204 can take any form suitable to lend structure to the apparatus 200 and support the casing 202. In one embodiment, the casing 202 can provide a main body to the apparatus 200 and can be operable to contain mechanisms (not shown in FIGS. 1A-1D) of the apparatus 200, such as the torque conversion apparatus or myriad of gears discussed with respect to FIGS. 3A-3D. The casing 202 can be fastened to the handle 204 and can further be configured to receive a cable via the cable groove 210. The casing 202 can additionally be coupled to the cutting nose 220, such that the nose 220 can protrude from the casing 202. In one example, the casing 202 can be a gearbox 202; in another example, the casing 202 can be a sphere, pyramid, or another other shape suitable to connect to the handle 204 and cutting nose 220 while casing mechanisms of the apparatus, such as those discussed in FIGS. 3A-3D. The casing 202 can also be configured to allow interaction with the mechanisms contained within the casing 202. For example, and as mentioned above, the casing 202 and cutting nose 220 can comprise recessed areas that together form a cable groove 210. The cable groove 210 can be of any size or shape suitable to receive a cable of any size. In this manner, and as an example, the casing 202 can be configured to allow mechanisms contained therein to interact with the cable, such as via the cable groove 210. As another example, the casing 202 can comprise one or more orifices from which an adapter 212 can protrude. In another embodiment, the adapter 212 can be contained within the casing 202, and a drill apparatus 114 can access the adapter 212 through a hole in the casing 202.

In another embodiment, the casing 202 can include a first member 206 and a second member 208. For example, the first member 206 can be operably coupled to the second member 208. In another example, the first member 206 can extend from the second member 208. In another example, the first member 206 can be configured to house a portion of a torque conversion mechanism in accordance with the principles of the present disclosure. For example, the first portion 206 can be configured to house epicyclic gearing or any other suitable gearing mechanism. In another example, the first member 206 can be substantially cylindrical, such as to minimize a profile of the first member 206 and accomplish housing of components of a torque conversion mechanism. In another embodiment, the second member 208 can be configured to house a different portion of a torque conversion mechanism. For example, the second member 208 can be configured to house a portion of a torque conversion mechanism, such as a sun gear, drive gear, and/or spur gear. In one embodiment, the adapter 212 can be configured to engage mechanisms disposed within the casing 202 via turning of the adapter 212. As an example, the adapter 212 can be configured to engage a power drill/screwdriver, with any suitable wrench head attached thereto, and transfer torque generated from the drill/screwdriver to mechanisms disposed within the casing 202. In one embodiment, the adapter 212 can comprise a hexagonal wrench head, a flat head, or any other wrench head suitable to transfer torque from the torque generator. In this manner, and as an example, the casing 202 can be configured to allow interaction with the mechanisms within the casing 202.

Figure 2A:
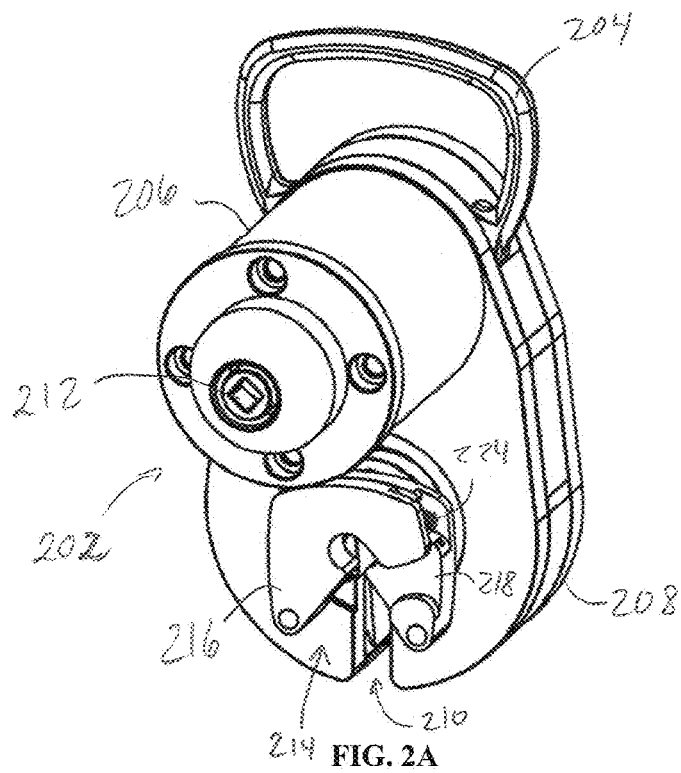
FIGS. 2A-2H illustrate perspective views of a shearing system, e.g., including a cable support, in accordance with the principles of the present disclosure.
Figure 2B:
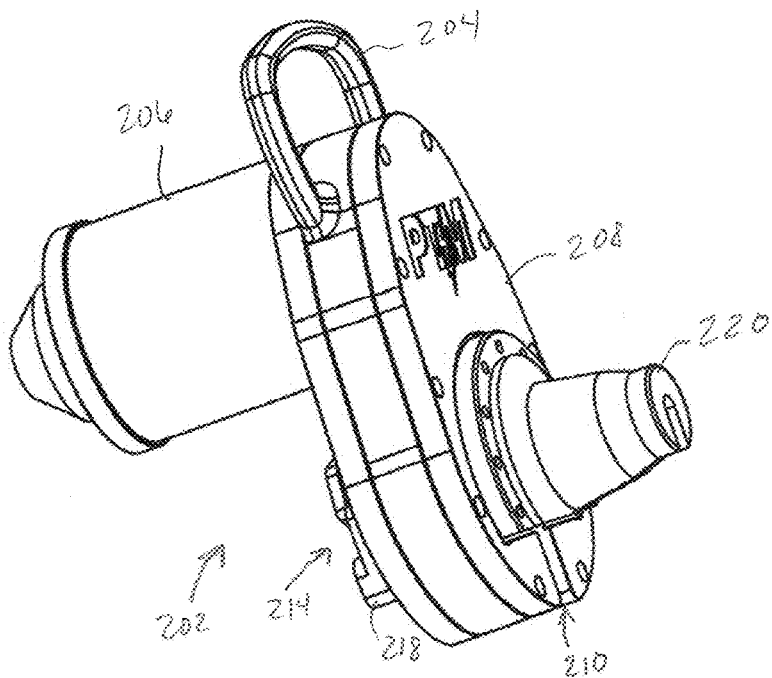
Figure 2C:
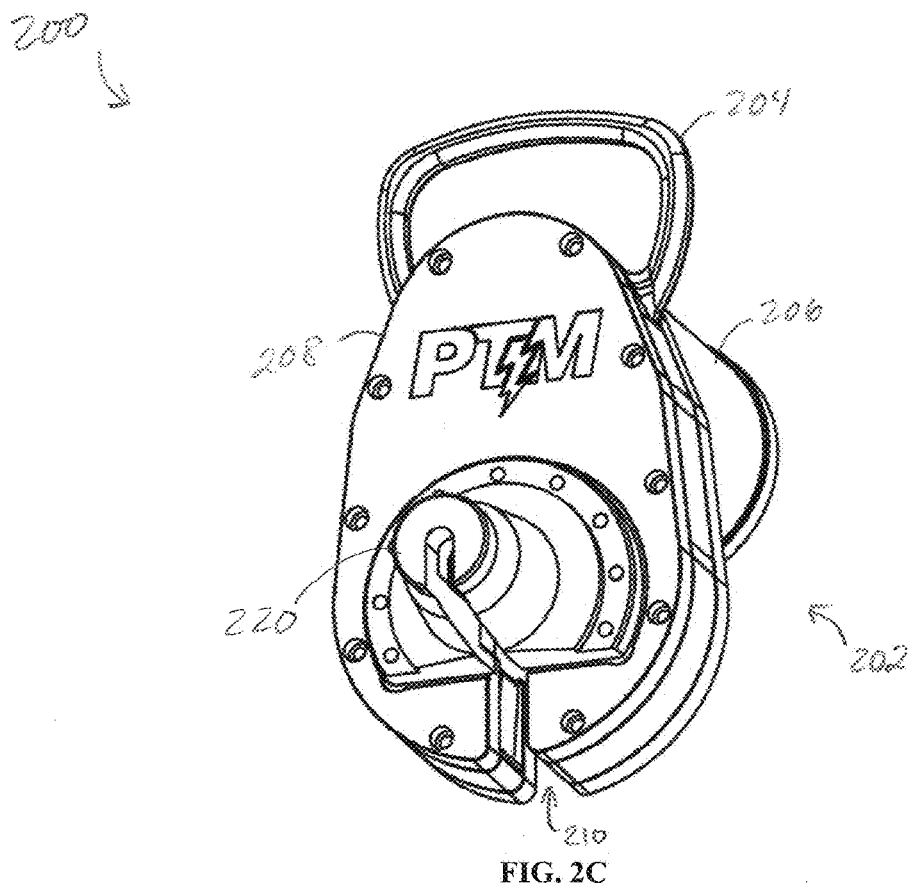
Figure 2D:
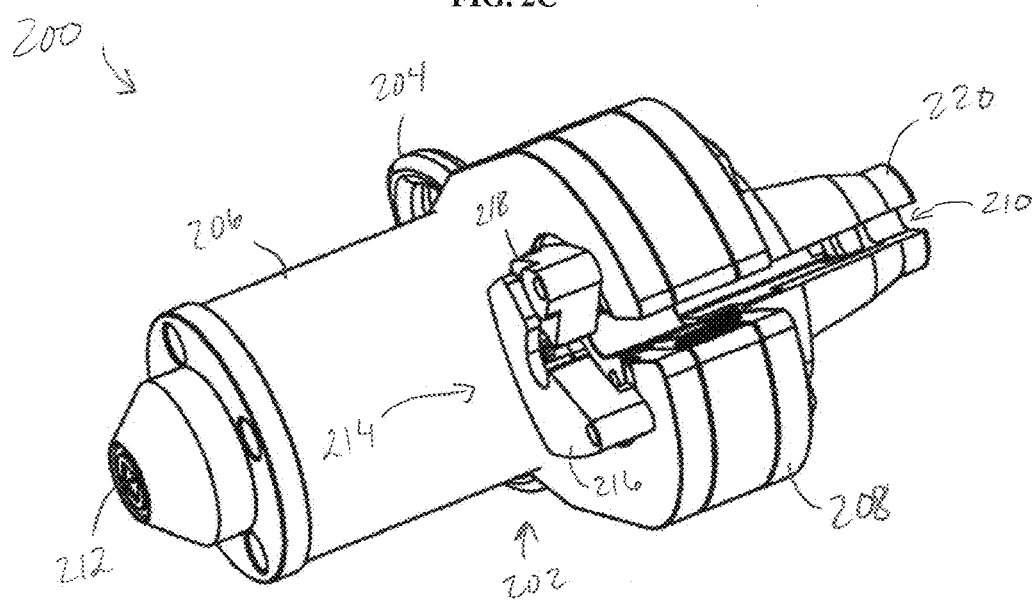
Figure 2E:
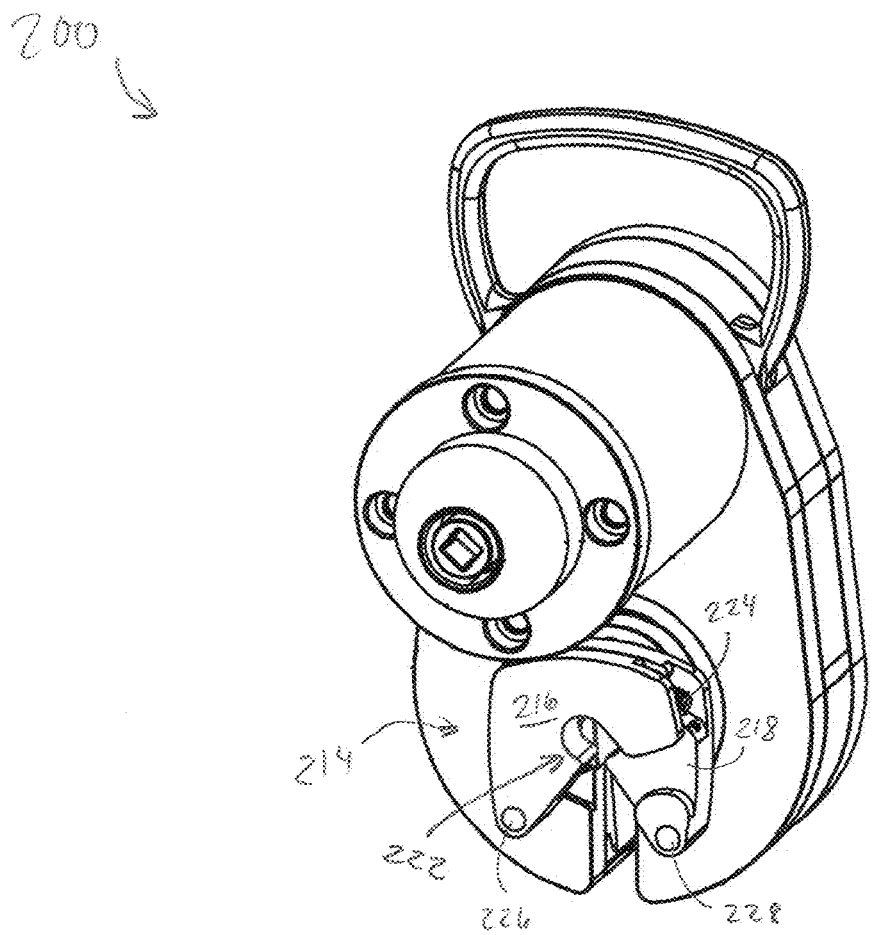
Figure 2F:
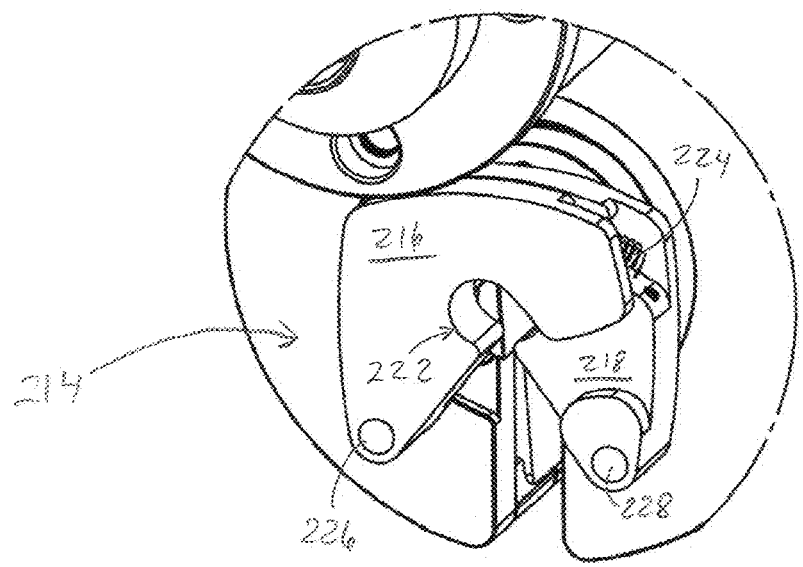
Figure 2G:
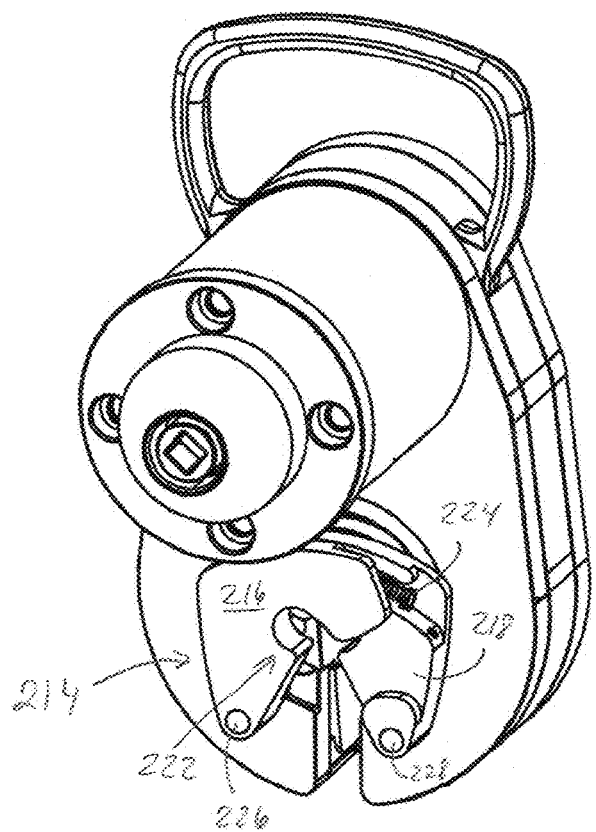
Figure 2H:
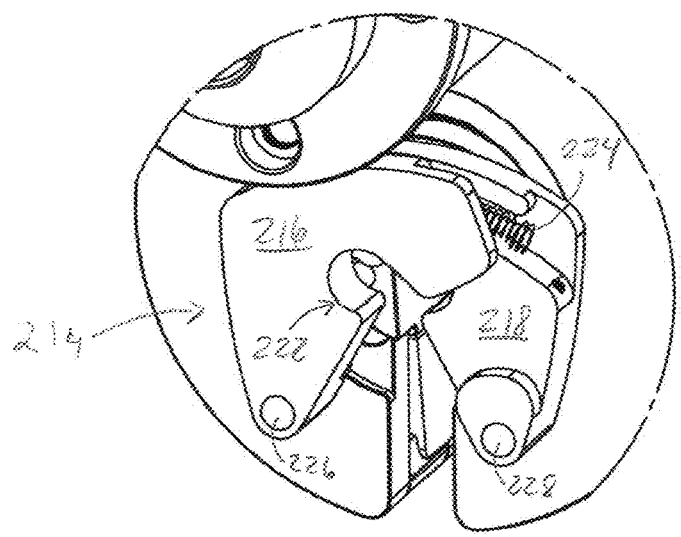
Figure 3A:
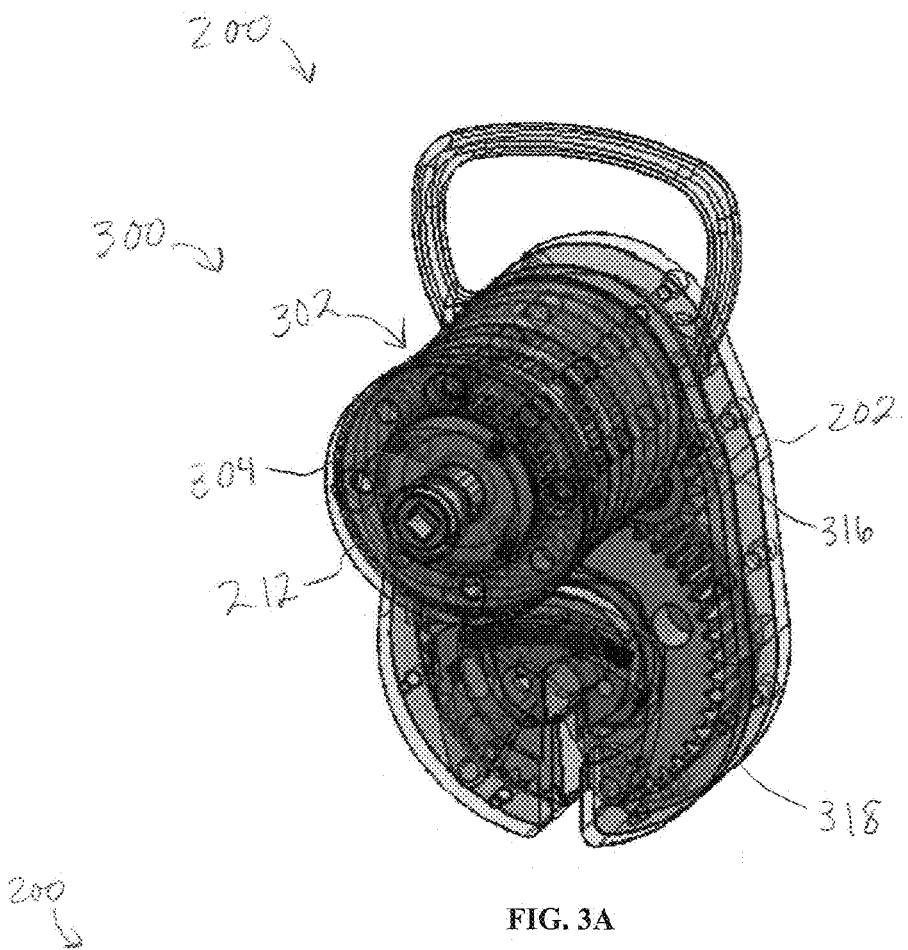
FIGS. 3A-3D illustrate perspective views of a torque conversion mechanism in accordance with the principles of the present disclosure.
Figure 3B:
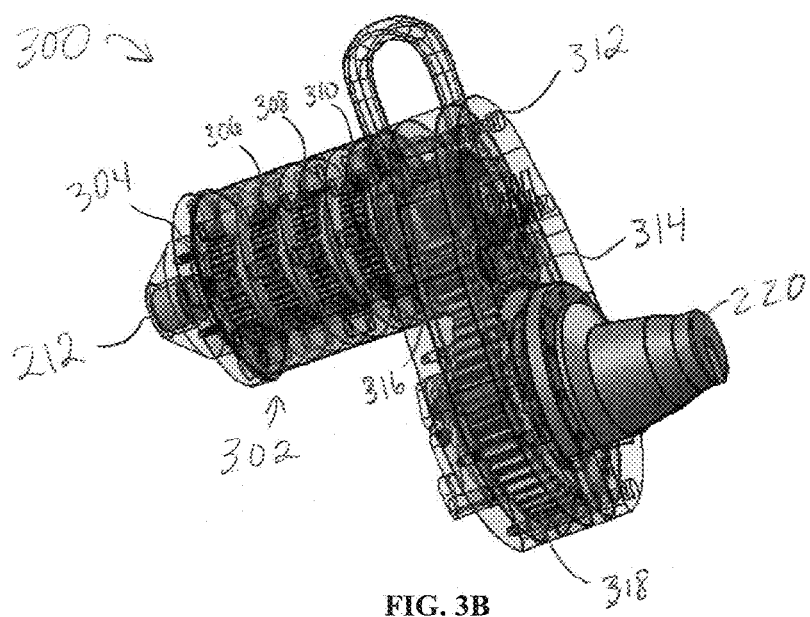
Figure 3C:
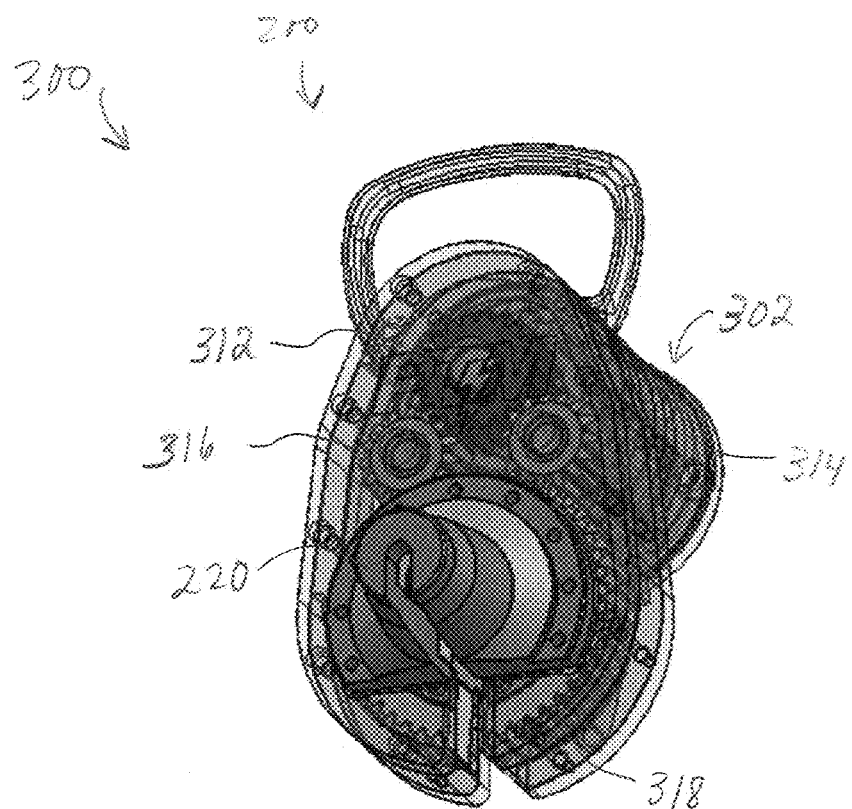
Figure 3D:
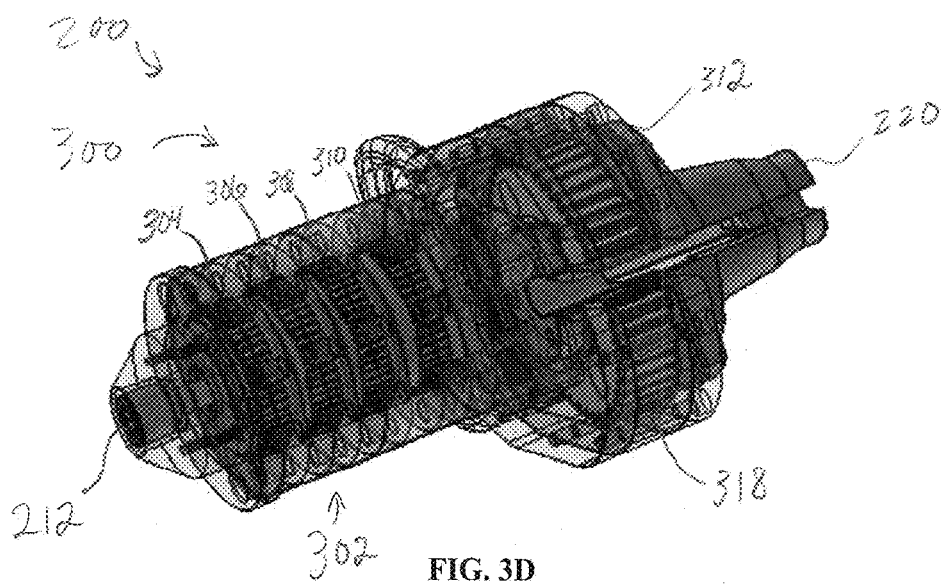

In another embodiment, the casing 202 can further include a cable support 214. For example, the cable support 214 can take the form of a latch 214 operable to support a cable within the cable groove 210. In one example, the support 214 can include a first member 216 and a second member 218. In another embodiment, the support 214 can include a spring 224 operable to mediate movement of the first member 216, the second member 218, or both. In another embodiment, the support 214 can be configured to receive a cable. For example, the support 214 can include an aperture 222 sized to circumscribe a cable. In another embodiment, the aperture 222 can be configured to expand or contract. For example, the first and/or second members 216, 218 can be coupled to the casing 202 via pins 226, 228, such that the first and/or second member 216, 218 can be hingedly attached to the casing 202. In another example, a spring 224 can be operably coupled with the first and/or second member 216, 218 such that expansion and/or contraction of the aperture 222 can be mediated by the spring 224. In one embodiment, and as illustrated in FIGS. 2G-2H, the support 214 can be "opened" via, for example, a hinge mechanism of one or both of the first or second member 216, 218, and after a cable is engaged within the cable groove, the support 214 can be "closed" (as illustrated in FIGS. 2E-2F) to offer support to the cable while it is within the groove 210. In another example, the spring 224 can be configured to maintain the support 214 in a "closed" configuration, such as via spring 224, and the support 214 can be further configured to achieve an "opened" position as a force is applied against the first and/or second member 216, 218 towards the aperture 222. In another example, the first and/or second member 216, 218 can be sloped towards the aperture 222, such as to facilitate the placement of a cable within the aperture 222.

In one embodiment, the support 214 can be configured to facilitate the removable coupling of a cable within the aperture 222 and/or cable groove 210. For example, the apparatus 200 can be lowered onto a cable while the support 214 is in a closed position. In another example, the support 214 can receive a cable between, e.g., the first and second members 216, 218, and as the apparatus 200 is lowered onto a cable, the first and second members 216, 218 can be pushed outwards from the cable, expanding the aperture 222, such that the cable can travel into the aperture 222. In another embodiment, once the cable is within the aperture 222, the spring 224 can cause the aperture 222 to contract, such as by mediating movement of the first and/or second member 216, 218. In another example, the support 214 and/or latch 214 can include any number of members suitable to facilitate the securing of a cable within the cable groove 210. In another embodiment, the support 214 can include any suitable mechanism to support the cable within the groove 210, such as latches, ties, supports, wedges, hooks, rings, attachment mechanisms, coupling mechanisms, or any other mechanism(s) suitable to facilitate the securing and/or removable coupling of a cable within the cable groove 210.

In one embodiment, the adapter 212 can interact with mechanisms disposed within the casing 202 to ultimately operate the cutting nose 220. For example, the nose 220 can protrude from the casing 202 such that the nose 220 can engage a cable within a pocket of a concrete support post-tensioning system. The nose 220 can include one or more blades (not shown in FIGS. 1A-1D) operable to sever a cable that is engaged within the cable groove 210 and cutting nose 220. As mentioned above, in one example, the nose 220 can be configured to fit within a pocket of a concrete support post-tensioning system such that the blades of the nose 220 can clip the cable within the pocket. In another embodiment, applying torque to the adapter 212 can initiate mechanisms disposed within the casing 202 that are in operable connection with the cutting nose 220 to engage a blade or blades of the nose 220 to facilitate shearing of the cable. In another embodiment, the cutting nose 220 can comprise a static blade and a rotating blade. In another embodiment, the cutting nose 220 can comprise any number of static blades and/or mobile blades to accomplish the shearing of a cable. In another embodiment, the cutting nose 220 can take the form of any cutting nose known in the art.

FIGS. 3A-3D depict another embodiment of the present disclosure. A torque conversion mechanism 300 can be included in a shearing apparatus 200. In one embodiment, the torque conversion mechanism 300 can include at least one gear. In one embodiment, casing 202 of the shearing apparatus 200 can contain the mechanism 300, and in one embodiment, the mechanism 300 can utilize torque generated at and transferred from the adapter 212 to facilitate operation of the cutting nose 220. In one embodiment, the mechanism 300 within the casing 202 can include epicyclic gearing (epicyclic gear train) (planetary gearset) 302. For example, epicyclic gearing 302 can be included in the first member of the casing 202. In another embodiment, epicyclic gearing 302 can include one or more planetary gear trains 304, 306, 308, 310 operably engaged with the adapter 212. For example, the adapter 212 can be operably coupled with a first sun gear 304, and the first sun gear 304 can be operably engaged with the first planetary gear train 304, such that turning of the adapter 212 can thereby turn the first sun gear 304 and consequently turn the first planetary gear train 304. In one embodiment, each of the planetary gear trains 304, 306, 308, 310 can include one or more sun gears, one or more planet gears, one or more carriers, and/or one or more ring gears (annular gears). In another embodiment, each of the planetary gear trains 304, 306, 308, 310 can be engaged with one or more other components of the torque conversion mechanism 300.

In another embodiment, the epicyclic gearing 302 can include a second sun gear 312. For example, the second sun gear 312 can be engaged with one or more of the planetary gear trains 304, 306, 308, 310. In another embodiment, the second sun gear 312 can be engaged with at least one spur gear 314, 316. In another embodiment, the at least one spur gear 314, 316 can be engaged with a drive gear 318. For example, the drive gear 318 can be configured to engage with the at least one spur gear 314, 316 and facilitate operation of the cutting nose 220. In another embodiment, the mechanism 300 can include any number and/or configuration of gears, levers, etc. suitable to utilize torque generated at the adapter 212 to mobilize blades of the cutting nose 220.

In one embodiment, the mechanism 300 can include a stopping mechanism, such as to prevent over-rotation of the mechanism 300. For example, the drive gear 318 can include a nub, a peg, a rod, corrugation, etc. that can facilitate prevention of over-rotation. For example, protrusion from the drive gear 318 can engage a channel on the interior of the casing 202, such that the movement of the drive gear 318 can be limited by the size and/or length of the channel. In another example, the stopping mechanism can be a timing channel. In another example, the stopping mechanism can utilize any gear of the mechanism 300 to prevent over-rotation of one or more gears of the mechanism 300. In another embodiment, the mechanism 300 can be configured to utilize torque applied from either direction to operate the cutting nose 220. For example, the mechanism 300 can be configured to utilize clockwise-torque and/or counter-clockwise-torque to sever a cable within the nose 220.

Principles of the present disclosure can be utilized to facilitate clipping of, e.g., the live end of a cable in a post-tensioning system. In another embodiment, a shearing apparatus (e.g., 200) and/or system in accordance with the principles of the present disclosure can be used to sever any other cable, tendon, strand, line, chain, rope, or other suitable substrate. In another embodiment, the present disclosure can offer several advantages. For example, the mechanism 300 can be capable of facilitating the dissipation of heat from the mechanism 300. In one example, the epicyclic gearing 302 can facilitate airflow throughout the apparatus 200 that can participate in heat dissipation. In another embodiment, the principles of the present disclosure can enhance the fidelity of cable shearing. For example, cables can be, e.g., left-hand-braided or right-hand-braided, and cutting a braided cable from the wrong direction can lead to fraying, unwinding, and/or general comprise of cable integrity. In one embodiment, a shearing apparatus in accordance with the principles of the present disclosure can apply a blade of a cutting nose from one direction according to the direction of torque receive at an adapter of the apparatus. For example, counter-clockwise torque applied at the adapter can correspond to causing a blade of the cutting nose to approach a cable held therein from the right side of the cable (e.g., when looking from the adapter of the apparatus to the nose of the apparatus); in another embodiment, clockwise torque can cause a blade of the cutting nose to approach the cable from the opposite direction. In another embodiment, blades of the cutting nose can approach the cable from any suitable direction, and the direction of the torque at the adapter can determine an approach of the blades of the nose.

The present disclosure offers several advantages:
1. Providing a portable, user-friendly apparatus operable to shear cables in a concrete support system without the use of hydraulics or dedicated batteries;
2. Providing a new use for existing power tools, such as power drills and screwdrivers;
3. Providing a system that can utilize manual or powered torque to accomplish cable shearing;

4. Increasing construction site and tool efficiency by obviating the need for dedicated, powered devices for cable shearing;
5. Converting torque from, for example, a power drill to pressure for cable shearing;
6. Providing a shearing apparatus that can shear a cable using clockwise and/or counter-clockwise torque; and
7. Providing a shearing apparatus that can shear a cable from different directions, such as depending on a braid or weave of the cable.

What is claimed is:

1. A method of shearing a cable in a concrete support system, the method comprising the steps of:
   providing a shearing apparatus, the shearing apparatus comprising:
      a casing;
      an adapter
      a torque conversion mechanism comprising a plurality of planetary train gears and disposed within the casing;
      a plurality of spur gears;
      a drive gear coupled to the torque conversion mechanism via the spur gears;
      a cutting nose coupled to the casing and in operable connection with the torque conversion mechanism via the drive gear;
      a cable support;
      a handle coupled to the casing; and
   a groove, wherein the cable support is disposed on a first side of the casing and the drive gear, and the cutting nose is disposed on a second side of the casing and the drive gear that is opposite the first side; removably coupling the shearing apparatus to a cable via the cable support; and
   applying torque to the adapter of the shearing apparatus via a torque generator.

2. The method of claim 1, wherein the cable support comprises:
   an aperture sized to at least partially circumscribe the cable;
   a first member hingedly coupled to the casing;
   a second member hingedly coupled to the casing; and
   a spring operably coupled to one or both of the first member and the second member.

3. The method of claim 1, wherein the drive gear comprises a protrusion operable to engage a channel on an interior of the casing.

4. A shearing apparatus comprising:
   a casing;
   a torque conversion mechanism disposed within the casing, the torque conversion mechanism comprising a plurality of planetary train gears, wherein the torque conversion mechanism is operable to be coupled to a torque generator;
   a plurality of spur gears;
   a drive gear coupled to the torque conversion mechanism via the spur gears;
   a cutting nose coupled to the casing, wherein the cutting nose is in operable connection with the torque conversion mechanism via the drive gear;
   a cable support; and
   a handle coupled to the casing;
   wherein the cable support is configured to be removably coupled to a cable; and wherein the cable support is disposed on a first side of the casing and the drive gear, and the cutting nose is disposed on a second side of the casing and the drive gear that is opposite the first side.

5. The shearing apparatus of claim 4, wherein the cable support comprises:
   an aperture sized to at least partially circumscribe the cable;
   a first member hingedly coupled to the casing;
   a second member hingedly coupled to the casing; and
   a spring operably coupled to one or both of the first member and the second member.

6. The shearing apparatus of claim 4, wherein the drive gear comprises a protrusion operable to engage a channel on an interior of the casing.

7. A shearing system comprising:
   a shearing apparatus comprising:
      a casing;
      an adapter;
      a torque conversion mechanism comprising a plurality of planetary train gears and disposed within the casing;
      a plurality of spur gears;
      a drive gear coupled to the torque conversion mechanism via the spur gears;
      a cutting nose coupled to the casing and in operable connection with the torque conversion mechanism via the drive gear;
      a cable support; and
      a handle coupled to the casing; and
   a torque generator engaged with the torque conversion mechanism via the adapter;
   wherein rotation of the adapter by the torque generator engages the torque conversion mechanism;
   wherein the torque conversion mechanism is operable to use the rotation at the adapter to mobilize the cutting nose; and wherein the cable support is disposed on a first side of the casing and the drive gear, and the cutting nose is disposed on a second side of the casing and the drive gear that is opposite the first side.

8. The shearing system of claim 7, wherein the cable support comprises:
   an aperture sized to at least partially circumscribe a cable;
   a first member hingedly coupled to the casing;
   a second member hingedly coupled to the casing; and
   a spring operably coupled to one or both of the first member and the second member.

9. The shearing system of claim 7, wherein the drive gear comprises a protrusion operable to engage a channel on an interior of the casing.

* * * * *